United States Patent
Arunkumar et al.

(10) Patent No.: US 9,582,715 B2
(45) Date of Patent: Feb. 28, 2017

(54) FEATURE SELECTION ALGORITHM UNDER CONDITIONS OF NOISY DATA AND LIMITED RECORDING

(71) Applicant: International Business Machines Corporation, Armonk, NY (US)

(72) Inventors: Saritha Arunkumar, Basingstoke (GB); Su Yang, Canterbury (GB)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 14/788,076

(22) Filed: Jun. 30, 2015

(65) Prior Publication Data

US 2017/0004362 A1    Jan. 5, 2017

(51) Int. Cl.
  *G06K 9/00* (2006.01)
  *G06N 99/00* (2010.01)
  *G06K 9/62* (2006.01)

(52) U.S. Cl.
  CPC ....... *G06K 9/00523* (2013.01); *G06N 99/005* (2013.01); *G06K 9/6256* (2013.01)

(58) Field of Classification Search
  None
  See application file for complete search history.

(56) References Cited

U.S. PATENT DOCUMENTS

| | | | | |
|---|---|---|---|---|
| 5,060,277 A | * | 10/1991 | Bokser | G06K 9/6218 382/160 |
| 5,838,816 A | * | 11/1998 | Holmberg | G06K 9/6218 367/131 |
| 7,092,553 B2 | | 8/2006 | Kuepper et al. | |
| 7,594,122 B2 | | 9/2009 | Milgramm et al. | |
| 7,961,955 B1 | | 6/2011 | Minter | |
| 8,750,628 B2 | | 6/2014 | Sato | |
| 8,885,984 B1 | * | 11/2014 | Lavi | G06K 9/4671 382/181 |
| 2005/0169529 A1 | * | 8/2005 | Owechko | G06K 9/6254 382/190 |
| 2007/0127824 A1 | * | 6/2007 | Luo | G06K 9/00369 382/224 |
| 2012/0172682 A1 | | 7/2012 | Linderman et al. | |
| 2014/0229473 A1 | * | 8/2014 | Mehrotra | G06F 17/3069 707/728 |

(Continued)

OTHER PUBLICATIONS

Baker et al, "An SFFS Technique for EEG Feature Classification to Identify Sub-Groups", Captured May 3, 2015, 2012 25th International Symposium on Computer- Based Medical Systems (CMBS), 4 pages, © 2012 IEEE, <http://ieeexplore.ieee.org/stamp/stamp.jsp?tp=&arnumber=6266361>.

(Continued)

*Primary Examiner* — Shervin Nakhjavan
(74) *Attorney, Agent, or Firm* — Lance I. Hochhauser

(57) ABSTRACT

Application of inter-class and intra-class filtering, based on aggregate point-to-point distances, to vector data for purposes of filtering the vector data for purposes of pattern recognition. In some embodiments: (i) the inter-class filtering is based on Euclidean distance, in all dimensions, between vector data points in vector space; and/or (ii) the intra-class filtering is based on a distance, in all dimensions, between vector data points in vector space.

20 Claims, 10 Drawing Sheets

(56) References Cited

U.S. PATENT DOCUMENTS

2016/0140409 A1* 5/2016 Milioris ............... G06K 9/18
382/182

OTHER PUBLICATIONS

Liu, et al., "Individual Feature Extraction and Identification on EEG Signals in Relax and Visual Evoked Tasks", First International Conference, ACBIT 2013, pp. 305-318, Sep. 16-17, 2013, © Springer-Verlag Berlin Heidelberg 2014.
Palaniappan, et al., "Biometrics from Brain Electrical Activity: A Machine Learning Approach"; IEEE Transactions on Pattern Analysis and Machine Intelligence, vol. 29, No. 4, Apr. 2007, © 2007 IEEE, pp. 738-742.
Marcel, et al., "Person Authentication using Brainwaves (EEG) and Maximum a Posteriori Model Adaption", IEEE, pp. 743-748.
Nguyen, et al., "A Proposed Feature Extraction Method for EEG-based Person Identification", The 2012 International Conference on Artificial Intelligence (ICAI'12), Jul. 16-19, 2012, pp. 826-831, <http://weblidi.info.unlp.edu.ar/worldcomp2012-mirror/p2012/ICA4683.pdf>.
Su, et al., "EEG-based Personal Identification: from Proof-of-Concept to a Practical System", IEEE Computer Society, 2010 International Conference on Pattern Recognition, pp. 3728-3731, © 2010 IEEE.
Su et al., "Evaluation of Recordaing Factors in EEG-based Personal Identification: a Vital Step in Real Implementations", 2010 IEEE International Conference on Systems Man and Cybernetics (SMC), Oct. 10-13, 2010, © 2010 IEEE, pp. 3861-3866.
"Cluster anaylsis", Wikipedia, the free encyclopedia, last modified on Mar. 25, 2015, 11 pages, <http://en.wikipedia.org/wiki/Cluster_analysis>.
"Feature selection", Wikipedia, the free encyclopedia, last modified on Mar. 22, 2015, 9 pages, <http://en.wikipedia.org/wiki/Feature_selection>.
"K-nearest neighbors algorithm", Wikipedia, the free encyclopedia, last modified on Mar. 16, 2015, 6 pages, <http://en.wikipedia.org/wiki/K-nearest_neighbors_algorithm>.
Chuang et al., "I Think, Therefore I Am: Usability and Security of Authentication Using Brainwaves", Financial Cryptography and Data Security Lecture Notes in Computer Science, vol. 7862, Apr. 1, 2013, pp. 1-16, © International Financial Cryptography Association 2013.
"Pattern recognition", Wikipedia, the free encyclopedia, last modified on Mar. 2, 2015, 12 pages, <http://en.wikipedia.org/wiki/Pattern_recognition>.
Gupta, "Wavelet Framework for Improved Target Detection in Oddball Paradigms Using P300 and Gamma Band Analysis", Biomedical Soft Computing and Human Sciences, vol. 14, No. 2, pp. 61-67, Jan. 1, 2009, © 1995 Biomedical Fuzzy Systems Association.
Yang et al., "Quality Filtering of EEG Signals for Enhanced Biometric Recognition", 2013 International Conference of the Biometrics Special Interest Group (BIOSIG), Sep. 5-6, 2013, pp. 1-4.
Yang et al., "Wavelet-based EEG Preprocessing for Biometric Applications", 2013 Fourth International Conference on Emerging Security Technologies, Aug. 2014, © 2013 IEEE, pp. 43-46.
"Hausdorff distance", Wikipedia, the free encyclopedia, last modified on Apr. 10, 2015, 5 pages, <http://en.wikipedia.org/wiki/Hausdorff_distance>.

* cited by examiner

400a

| CLASS | DAY | VECTOR | MORNING VECTOR VALUE | AFTERNOON VECTOR VALUE |
|---|---|---|---|---|
| PERSON A | MON | A1 | 2900 | 698 |
| PERSON A | TUES | A2 | 2376 | 6025 |
| PERSON A | WED | A3 | 1898 | 3502 |
| PERSON A | THURS | A4 | 2111 | 2195 |
| PERSON A | FRI | A5 | 4750 | 5221 |
| PERSON B | MON | B1 | 11500 | 4900 |
| PERSON B | TUES | B2 | 5987 | 6543 |
| PERSON B | WED | B3 | 4152 | 3587 |
| PERSON B | THURS | B4 | 1012 | 2100 |
| PERSON B | FRI | B5 | 5543 | 3802 |
| PERSON B | SAT | B6 | 10102 | 2498 |
| PERSON B | SUN | B7 | 2945 | 3200 |

NUMBER OF STEPS WALKED MORNING AND AFTERNOON

FEATURE SELECTION ALGORITHM UNDER CONDITIONS OF NOISY DATA AND LIMITED RECORDING

BACKGROUND

The present invention relates generally to the field of pattern recognition, and more particularly to selecting subsets of data associated with classes in pattern recognition in situations with noisy and/or sparse data.

The Wikipedia entry for "pattern recognition" (http://en.wikipedia.org/wiki/Pattern_recognition, as of Apr. 16, 2015) states as follows: "Pattern recognition is a branch of machine learning that focuses on the recognition of patterns and regularities in data, although it is in some cases considered to be nearly synonymous with machine learning . . . . Pattern recognition systems are in many cases trained from labeled 'training' data (supervised learning), but when no labeled data are available other algorithms can be used to discover previously unknown patterns (unsupervised learning) . . . . Pattern recognition algorithms generally aim to provide a reasonable answer for all possible inputs and to perform 'most likely' matching of the inputs, taking into account their statistical variation. This is opposed to pattern matching algorithms, which look for exact matches in the input with pre-existing patterns."

In identifying patterns and/or creating indicia of patterns to be identified, pattern recognition may employ data collected from machine based sensor hardware for various "classes." One example of this is when sensors collect data relevant to brain activity, where the "classes" are the different brains from which the sensor data is collected.

SUMMARY

According to an aspect of the present invention, there is a method, computer program product, and/or system that performs the following operations (not necessarily in the following order): (i) receiving, by machine logic of a computer, a set of vector data, wherein the set of vector data includes a plurality of vector values from each class of a plurality of classes; (ii) applying, by machine logic of the computer, an inter-class filtering to the set of vector data, wherein the inter-class filtering is based, at least in part, on an inter-class distance; and (iii) applying, by machine logic of the computer, an intra-class filtering to the set of vector data, wherein the intra-class filtering is based, at least in part, on an intra-class distance. The inter-class distance is based on a sum of distances between: (i) a subject vector value; and (ii) at least some of the vector values of at least some of the other class(es) of the plurality of classes. The first intra-class distance is based on a sum of distances between: (i) a subject vector value; and (ii) at least some of the vector values in the same class as the subject vector value.

DETAILED DESCRIPTION

Figure 1:
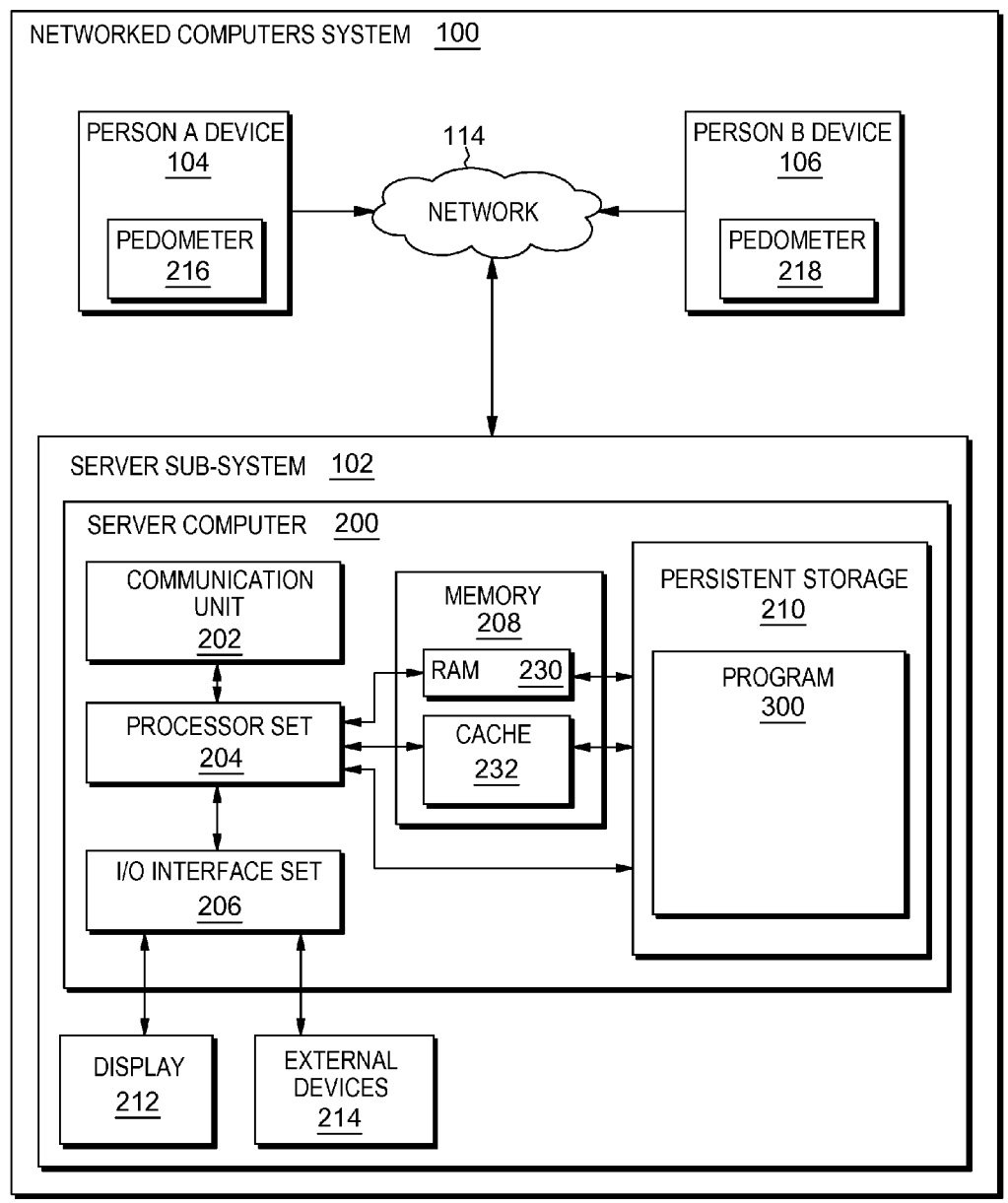
FIG. 1 is a block diagram view of a first embodiment of a system according to the present invention.

Application of inter-class and intra-class filtering, based on aggregate point-to-point distances, to vector data for purposes of filtering the vector data for purposes of pattern recognition. In some embodiments: (i) the inter-class filtering is based on Euclidean distance, in all dimensions, between vector data points in vector space; and/or (ii) the intra-class filtering is based on a distance, in all dimensions, between vector data points in vector space. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; person a device systems 104; person b device 106; communication network 114; server computer 200; communication unit 202; processor set 204; input/output (I/O) interface set 206; memory device 208; persistent storage device 210; display device 212; external device set 214; pedometers 216, 218; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
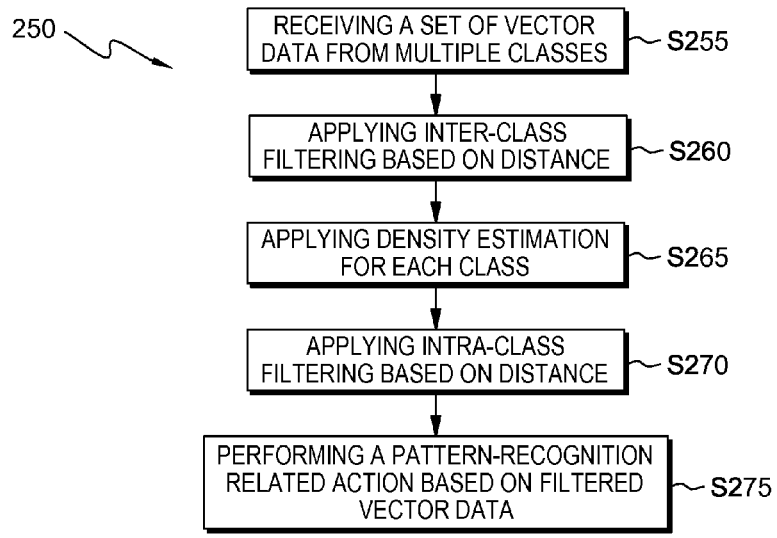
FIG. 2 is a flowchart showing a first embodiment method performed, at least in part, by the first embodiment system.
Figure 3:
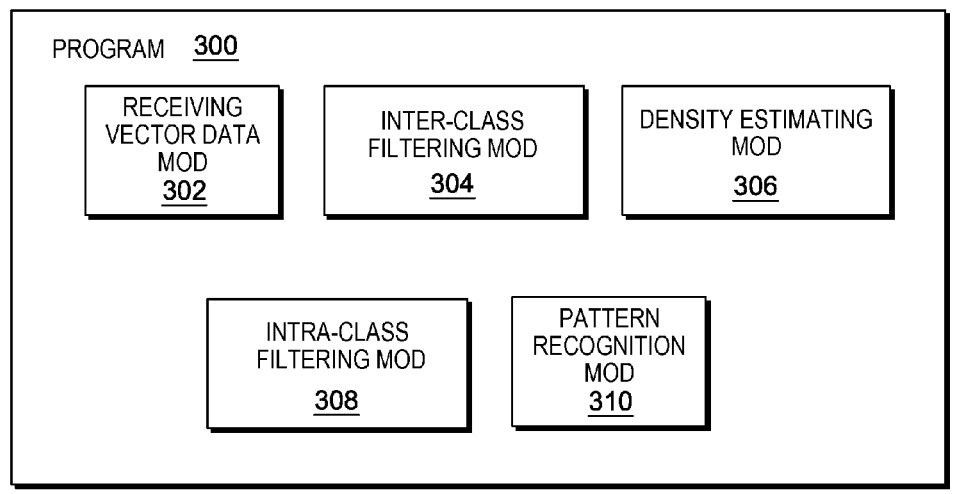
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks). An example accompanies the discussion of this method and associated software, in which two individuals walk a number of steps in the morning and afternoon (as measured by a pedometer). In some embodiments of the present invention, feature selection is also referred to as instance reduction.

Processing begins at operation S255, where receiving vector data module ("mod") 302 receives a set of vector data from multiple classes. In this example, server sub-system 102 receives a set of vector data about Person A from Persona A device 104 (as recorded by pedometer 216) (FIG. 1) and about Person B from Person B device 106 (as recorded by pedometer 218) (FIG. 1). The data is compiled into a table (see FIG. 4A). As depicted in step record table 400a, Person A walked for five days and Person B walked for seven days. Each person constitutes a different class and each day for each person constitutes a vector within that class. More specifically, a "vector," as that term is used herein, is a data set that has: (i) multiple dimensions; and/or (ii) a scalar value (or quantity) respectively associated with each dimension. In this example, the "dimensions" are morning and afternoon, meaning the vector values in this example are two-dimensional. The scalar values are steps taken by the person in each dimension (that is, a vector value has a step value for the morning dimension and a step value for the afternoon dimension). Alternatively, in other embodiments of the present disclosure, vectors may have more than two dimensions.

Figures 4A, 4B:
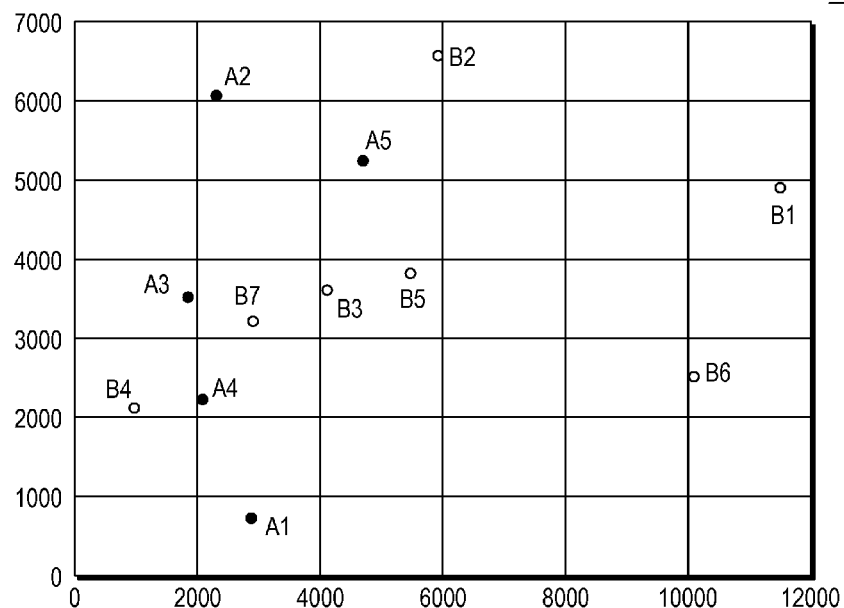
FIG. 4A is a table showing data for a set of classes.
FIG. 4B is a scatterplot of data for a set of classes.

The vector data presented in step record table 400a can also be presented as a scatterplot (see FIG. 4B). Two-dimensional step record scatterplot 400b, visually depicts the number of steps taken by each person on each day. Vectors from Person A (class a) are represented as filled-in circles, while vectors from Person B (class b) are represented as circles. In step record scatterplot 400b: (i) the x-axis represents the morning dimension; and (ii) the y-axis represents the afternoon dimension. Alternatively, in other embodiments of the present disclosure, the dimensions may be represented in other ways, such as a three-dimensional vector space with axial, angular, and radial dimensions.

Figure 4C:
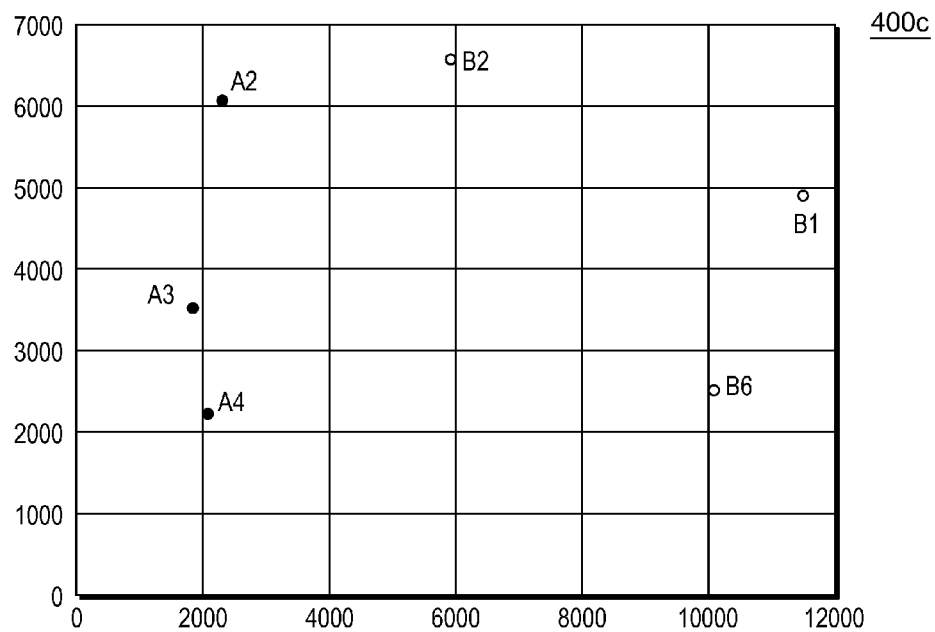
FIG. 4C is a scatterplot of filtered data for a set of classes.

Processing proceeds to operation S260, where inter-class filtering mod 304 applies an inter-class filtering based on "distance" to reduce the number of vector values under consideration in a way that reduces signal overlap between the two classes. As shown in FIG. 4C, at operation S260, the classes are reduced to three vector values based on inter-class "distance" values for the vector values. This concept of "distance," and some possible alternative ways of measuring distance according to various embodiments of the present invention, will be discussed in the following paragraph.

In this example, the inter-class "distance" for each vector value used in the inter-class filtering of operation S260 is the aggregate distance as measured exclusively along the x-axis (that is, the morning dimension) between: (i) the vector value whose distance value is being determined; and (ii) each vector value in the class other than the class of the vector value whose distance value is being determined. This used of "distance," taken exclusively as an x-axis distance, is not necessarily the preferred way of measuring "distance," but it does help: (i) to a reader to see how inter-class filtering works by "eyeballing" scatterplots 400b and 400c; and (ii) to show that different ways of measuring distance from a "subject vector value" (that is, the vector value having its distance value determined) may be used in various embodiments of the present invention. Alternatively, distance could be measured in many other ways, including: (i) a linear distance along the y-axis; (ii) a linear distance in all dimensions (that is, a Euclidean distance as will be further discussed, below, in the Further Comments and/or Embodiments sub-section of this Detailed Description section); (iii) a sum of the squares (or other exponent greater than one) of the Euclidean distances between a subject vector value and the vector values of the other classes; (iv) a sum of the square roots (or other exponent less than one) of the Euclidean distances between a subject vector value and the vector values of the other classes; (v) a set of weighted distances, where distance components in each dimension are considered, but assigned different weighting coefficients; and/or (vi) a cyclic distance (for example, a scheme where an angular scalar value of zero radians is considered to have a zero angular component distance from an angular scalar value of two times pi radians). Ultimately, the system designer should determine the best way of measuring "distance" for a given application.

As a further possible variation, the aggregate distance value for a subject vector value might not consider all of the vector values of the other class. For example, some proportion, or number, of high distance "outliers" might be discarded in the process of calculating a distance value in some embodiments.

In this example, three vectors from each class with the greatest aggregate x-axis distance from the vectors of the other class are retained and the other vectors in that class are discarded. In this example, as should be readily ascertainable by reviewing scatterplot 400b: (i) from class a, vectors A2, A3, and A4 (the most horizontally distant from the B points) are retained; and (ii) from class b, vectors B1, B2, and B6 (the most horizontally distant from the A points) are retained. FIG. 4C depicts inter-class filtered scatterplot 400c, showing the resulting scatterplot after the machine logic of mod 304 performs the inter-class filtering of operation S260. In some embodiments of the present invention, multiple iterations of inter-class filtering are performed. In some embodiments of the present invention, various iterations of inter-class filtering use various ways of determining a "distance."

Processing proceeds to operation S265, where density estimating mod 306 estimates a representative vector value for a class. In this example (not separately shown), a density estimation would determine the density estimation of the representative value for class a exists near 2150 steps walked in the morning (x-axis value) and 3900 steps walked in the afternoon (y-axis value). Additionally, in this example, a density estimation would determine the density estimation of the representative value for class b exists near 9200 steps walked in the morning and 4650 steps walked in the afternoon. In some embodiments of the present invention, density estimating mod 306 determines an exact value for the density estimation. In some embodiments of the present invention, density estimating mod 306 uses a range of values (for example, 2150±25 steps). In some embodiments of the present invention, the range of values correlates to a standard deviation.

Figure 4D:
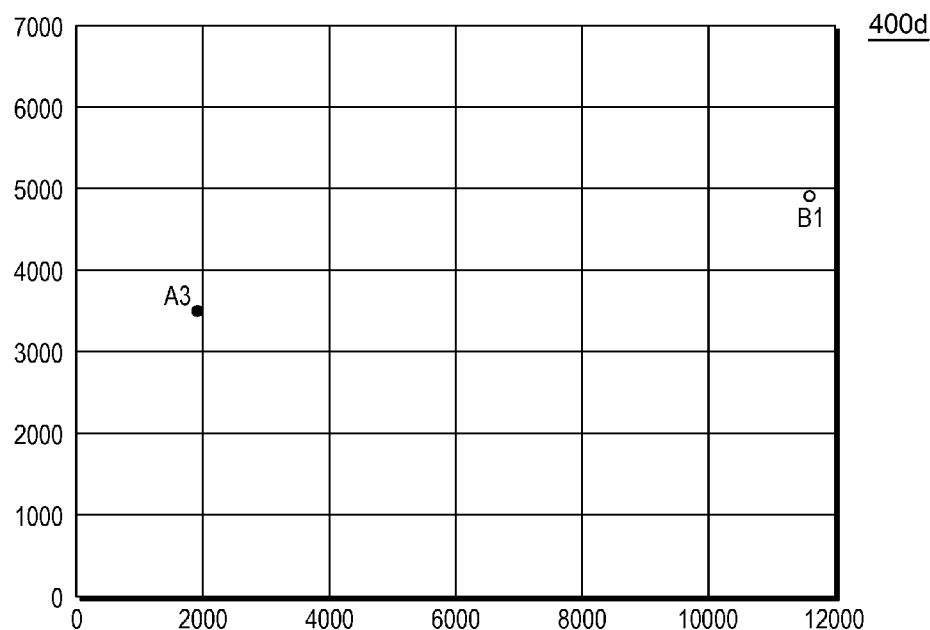
FIG. 4D is a scatterplot of further filtered data for a set of classes.
Figure 4E:
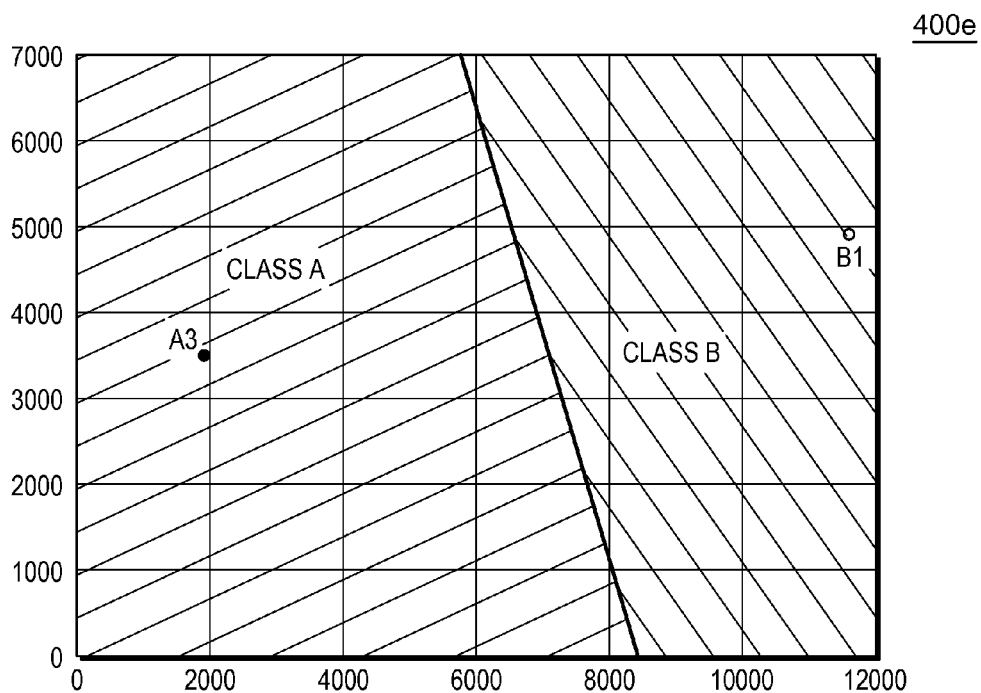
FIG. 4E is a scatterplot of pattern recognition based on filtered data for a set of classes.

Processing proceeds to operation S270, where intra-class filtering mod 308 applies an intra-class filtering based on "distance." In this example, an intra-class filtering eliminates vector values that have the greatest aggregate distance (with only distance in the afternoon dimension considered) with respect to other vector values in the same class. In other words, for the intra-class filtering of operation S270: (i) for each A point, the aggregate of vertical distances to the other A points is used to calculate the "distance"; (ii) for each B point, the aggregate of vertical distances to the other B points is used to calculate the "distance"; and (iii) only the one point from each class with the smallest distance value survive the intra-class filtering. As with the previous example, the "distance" could be defined in many other different ways, such as Euclidean distance (further discussed, below, in the Further Comments and/or Embodiments sub-section of this Detailed Description section). Comparing the scatterplots 400c and 400d (see FIG. 4D) should help the reader see how the machine logic of mod 308 performs intra-class filtering in this simple example.

In some embodiments of the present invention, a system designer may desire to further separate a plurality of classes. In some embodiments of the present invention, further distinguishing the plurality of classes and further reduction of the signal overlap among the plurality of classes is achieved by an additional inter-class filtering. In some embodiments of the present invention, multiple iterations of intra-class filtering are performed. In some embodiments of the present invention, various iterations of intra-class filtering use various ways of determining a "distance."

Processing terminates at operation S275, where pattern recognition mod 310 performs a pattern-recognition related action based on a set of filtered vector data. In some embodiments of the present invention, the pattern-recognition related action is assigning a pattern to each class based on the retained vectors. In some embodiments of the present invention, pattern recognition mod 310 uses the density estimation of step S265 as the representative value for a class. In some embodiments of the present invention, the pattern-recognition related action is determining a class to which an unknown set of vectors belongs based on a previous pattern recognition action. In this example, a pattern is assigned to each class based on the retained vector (see FIG. 4F). Based on the refined classes, vector A2 and vector B6 are representative of class a and class b respectively. Using a root mean square distance, a likelihood that a new vector belongs to a certain class is determined. FIG. 4F depicts class probability scatterplot 400f. Class probability scatterplot 400f includes a shaded area in which a new vector is more likely to belong to class a and a shaded area in which a new vector is more likely to belong to class b.

While operation S275 describes a specific "pattern recognition related activity," many different types of pattern recognition related activities may be performed using the filtered subset of vector values determined by flowchart 250, such as: (i) creating a new pattern recognition signature; (ii) refining an existing pattern recognition signature; (iii) discarding an ineffective pattern recognition signature; (iv) performing pattern recognition; and/or (v) performing pattern matching.

III. Further Comments and/or Embodiments

Embodiments of the present invention relate to the field of pattern recognition. Some embodiments of the present invention relate more specifically to electroencephalography (EEG). Some embodiments of the present invention recognize that the current state of the art includes schemes requiring long recordings for both training and testing samples. Some of these schemes require a large number of independent, medical grade sensors.

Embodiments of the present invention solve both these problems. Some embodiments of the present invention perform authentication using low cost headsets with much shorter recordings for both training and testing. Some embodiments of the present invention require a less rich target signature and/or a less rich feature space. Some embodiments of the present invention enable classification much faster than solutions known in the art.

Embodiments of the present invention relate to the field of pattern recognition. Some embodiments of the present invention relate more specifically to the application of biometrics. Some embodiments of the present invention focus on solving two major problems: (i) how to reduce inter-class similarities; and/or (ii) how to reduce intra-class variances. Some embodiments of the present invention recognize that art implementing current recognition solutions for some physical biometrics (for example, iris patterns and fingerprint patterns) are large and often cumbersome in nature, resulting in major issues. Some embodiments of the present invention recognize that art implementing current recognition solutions for some behavioral biometric signals (for example, EEG signals) introduce an additional problem. In some instances, behavioral biometric signals provided by the one individual (sometimes hereinafter referred to as a class) under different circumstances and/or at different times are often quite diverse. Art implementing these solutions incurs significant intra-class variation within one behavioral biometric signal class of pattern recognition. Art implementing these solutions expresses these issues through sparse intra-class spreads of extracted behavioral biometric signal features.

Some embodiments of the present invention identify a subset of the original training feature space for purposes of selecting training examples. Some embodiments of the present invention implement an operational algorithm. The operational algorithm consists of two Stages. In some embodiments of the present invention, the combination of Stage I and Stage II of the algorithm ensures faster authentication of behavioral biometric signals. Some embodiments of the present invention use a low cost sensor (for example, a headset). Some embodiments of the present invention require a much shorter recordings for both training and testing.

Figure 5:
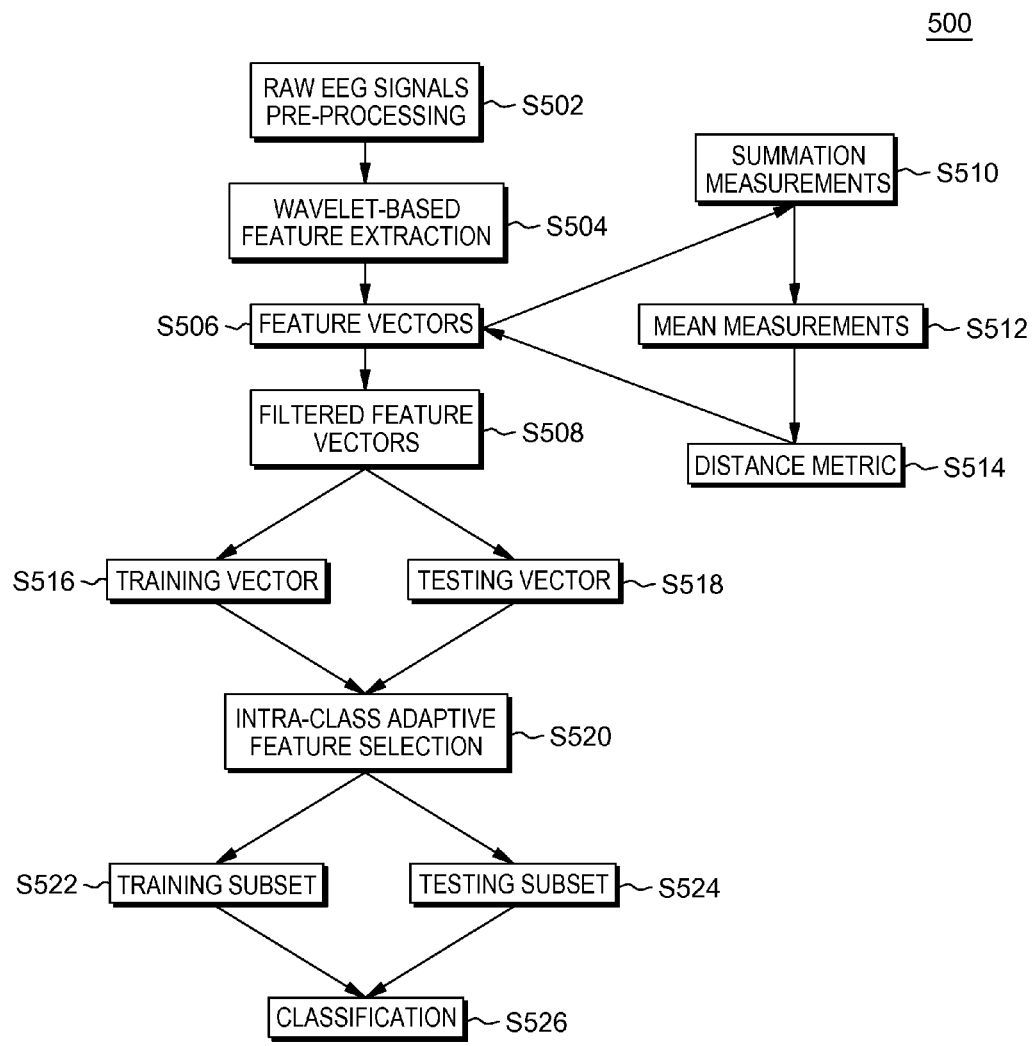
FIG. 5 is flowchart showing a second embodiment method performed, at least in part, by a second embodiment system.

FIG. 5 depicts operational algorithm 500. In this example, Stage I of operational algorithm 500 includes Operations S510, S512, S514, S506, and S508. In this example, Stage II of operational algorithm 500 includes Operations S516, S518, S520, S522, S524, and S526. In some embodiments of the present invention, Stage II is a more prominent component.

Figure 6:
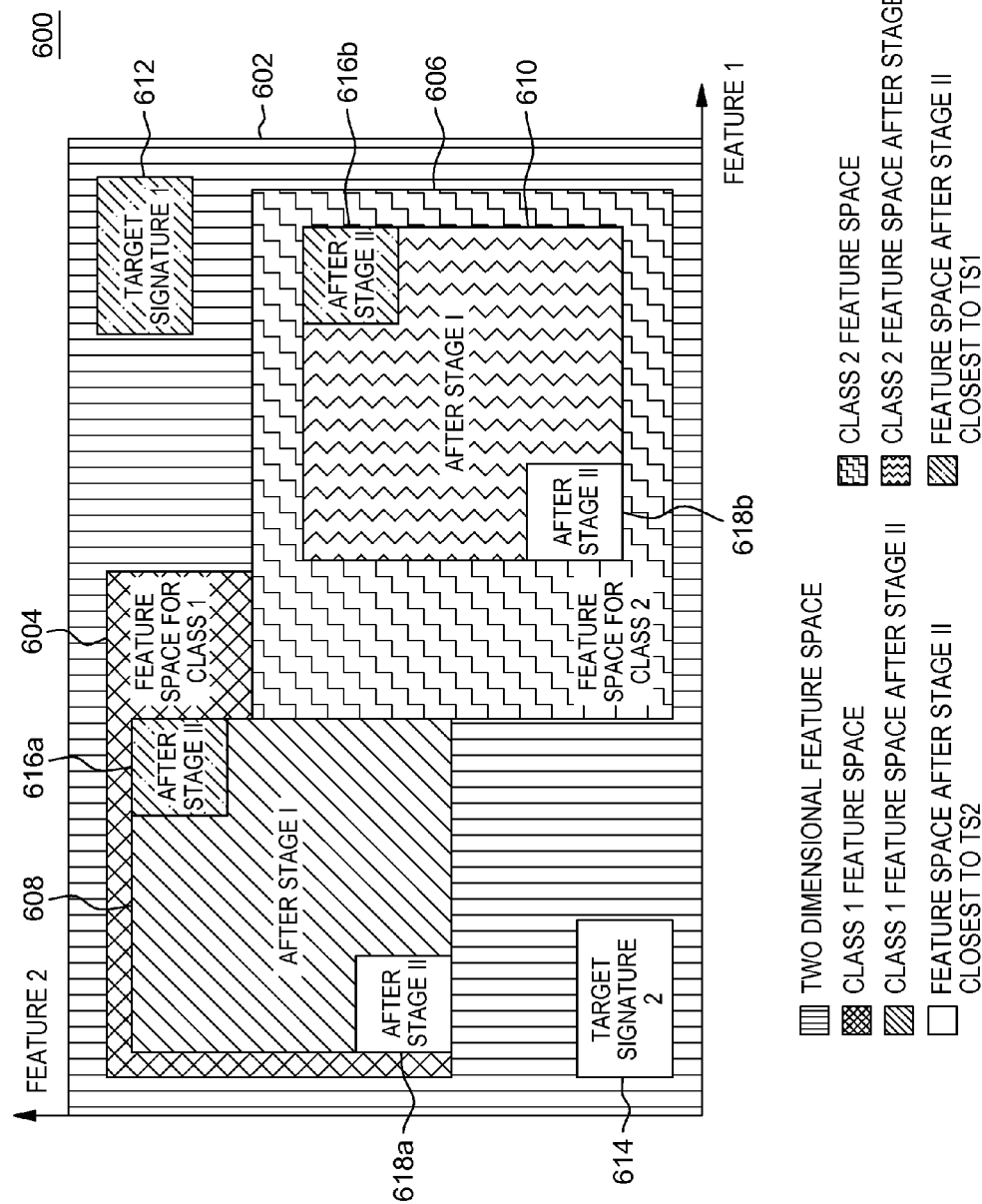
FIG. 6 is a two dimensional feature space diagram.

FIG. 6 depicts two-dimensional feature space 600 illustrating an implementation of the operational algorithm. The feature space for Class 1 is represented by feature element 604 (a rectangle, a portion of which is covered by other feature elements); the feature space for Class 2 is represented by feature element 606 (a rectangle, a portion of which is covered by other feature elements). After application of Stage I of the operational algorithm: the feature space for Class 1 is reduced to feature element 608 (a subset of feature element 604; also a rectangle, a portion of which is covered by other feature elements); the feature space for Class 2 is reduced to feature element 610 (a subset of feature element 606; also a rectangle, a portion of which is covered by other feature elements). As depicted in FIG. 6, after application of Stage I of the operational algorithm, the inter-class feature space is better separated (that is, there is no overlap between the feature space for Class 1 and the feature space for Class 2). After application of Stage II of the operational algorithm the optimal subspace (feature space) for each class is further reduced. The feature space for Class 1 is reduced to feature spaces 616a and 618a. The feature space for Class 2 is reduced to feature spaces 616b and 618b. When comparing a set of new target signatures (first target signature 612 and second target signature 614) to these reduced feature spaces, it is determined that first target signature 612 belongs to Class 2 (feature element 616b) and that second target signature 614 belongs to Class 1 (feature element 618a).

Experimental testing of embodiments of the present invention have improved recognition rates over methods known in the art, as seen in the accompanying table:

TABLE 1

| Algorithm Performance Comparison | |
|---|---|
| Algorithm | Recognition Rate |
| Conventional methods | 22% |
| Operation S275 (without feature selection) | 36.84% |
| Operations S260 and S275 (feature selection with inter-class filtering) | 53.57% |
| Operation S270 and S275 (feature selection with intra-class filtering) | 59.29% |
| Operations S260, S270, and S275 (feature selection with inter-class and intra-class filtering) | 85.71% |

In some embodiments of the present invention, the organizational algorithm proceeds in a variety of operations. In some embodiments of the present invention, a set of raw signals are segmented into multiple windows in a time domain. In some embodiments of the present invention, wavelet packet decomposition (WPD) is performed on a set of windows within a time domain. In some embodiments of the present invention, a wavelet coefficient is generated for a window. In some embodiments of the present invention, a subset of the set of windows (bands) are selected for feature extraction.

Figure 7:
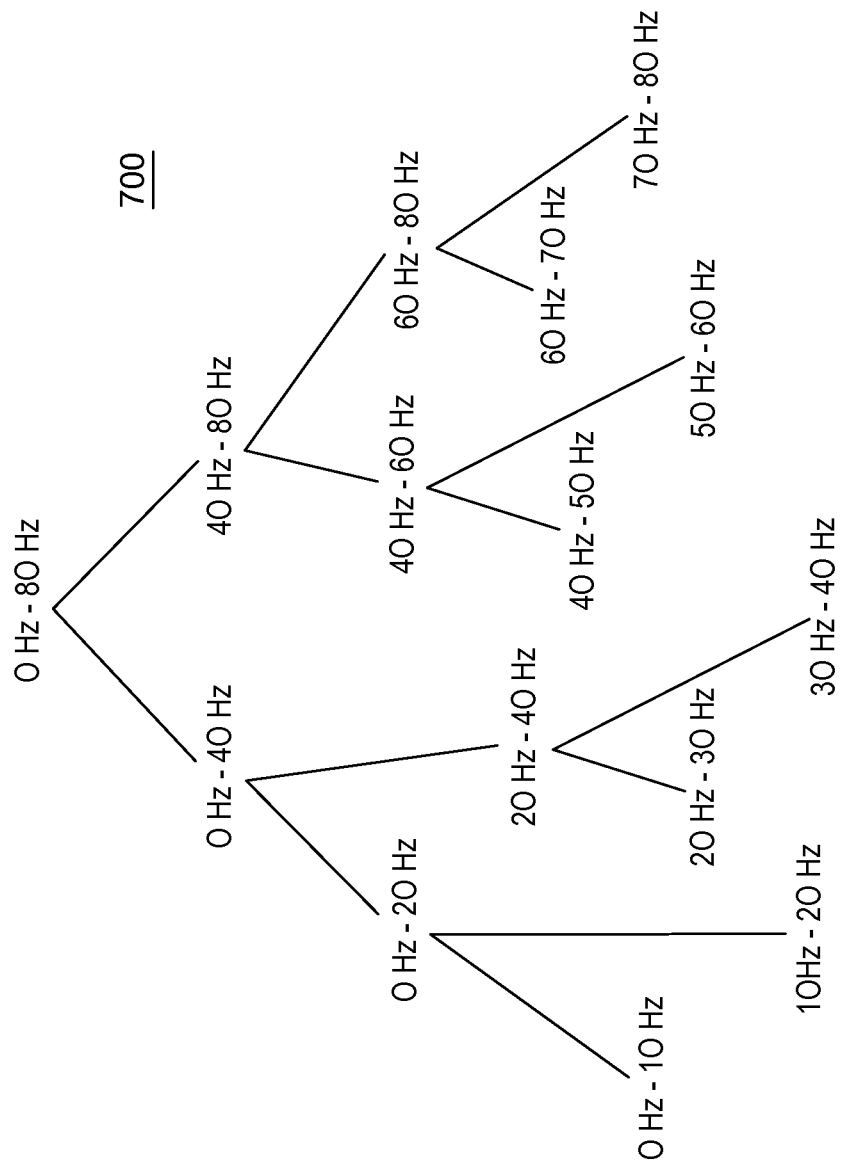
FIG. 7 is a wavelet packet decomposition diagram.

FIG. 7 depicts WPD 700, the wavelet packet decomposition of a signal. In this example, the signal originated as a single band of 0 Hz to 80 Hz. The signal was decomposed three times (three levels), each time dividing the band in half, resulting in eight bands (0 Hz to 10 Hz; 10 Hz to 20 Hz; 20 Hz to 30 Hz; 30 Hz to 40 Hz; 40 Hz to 50 Hz; 50 Hz to 60 Hz; 60 Hz to 70 Hz; and 70 Hz to 80 Hz). Each of these eight bands represents a single feature.

In this example, five feature bands are retained (0 Hz to 10 Hz; 10 Hz to 20 Hz; 20 Hz to 30 Hz; 30 Hz to 40 Hz; and 50 Hz to 60 Hz). Because five feature bands are selected, a five-dimension feature vector is used for the feature selection. The five dimensions (features) are uncorrelated. The standard deviation of the wavelet coefficients (resultant bands after decomposition) is computed to capture the dynamic nature the of EEG signals.

In this example, features contain multiple observations (readings of the signal). The feature selection algorithm (operational algorithm) is applied to the features. The feature selection algorithm allows for adaptive reduction of the number of the observations for the features and improve the accuracy with which the class to which a feature belongs is recognized. The feature selection algorithm includes two stages, the first relates to inter-class similarity and the second relates to the intra-class feature space.

Figure 8A:
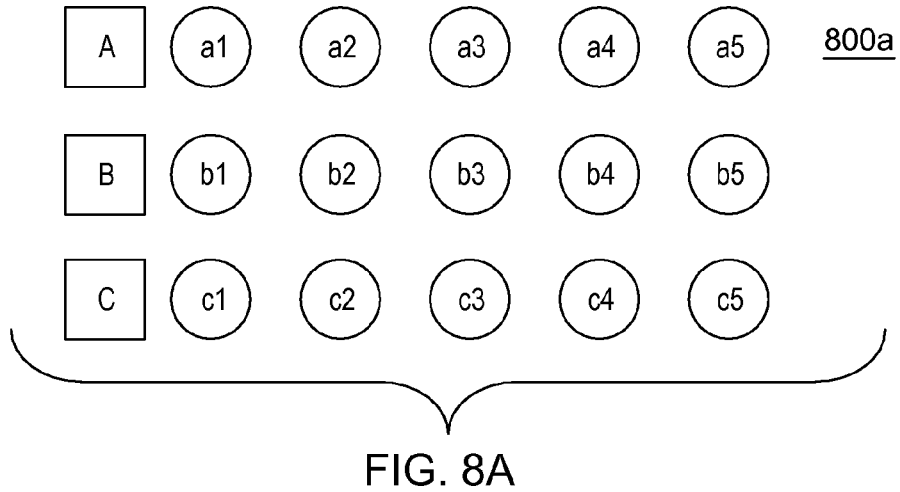
FIG. 8A is a feature matrix diagram.
Figure 8B:
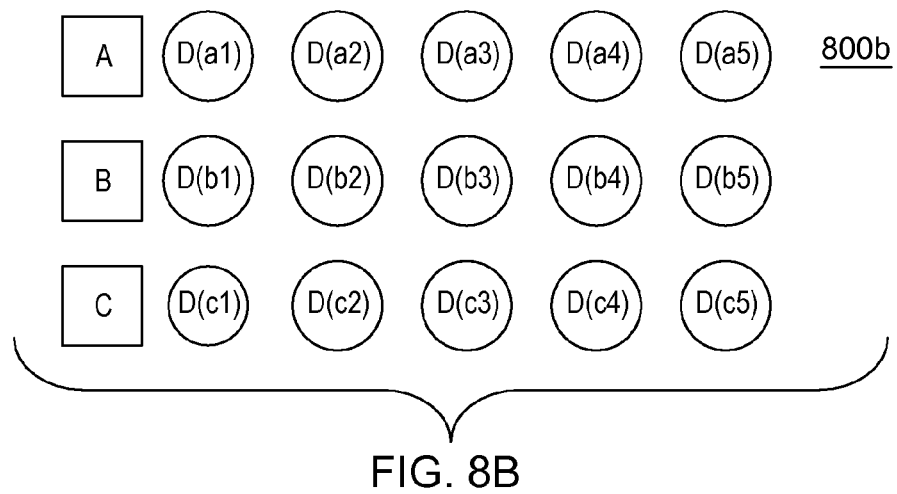
FIG. 8B is a feature matrix diagram.
Figure 8C:
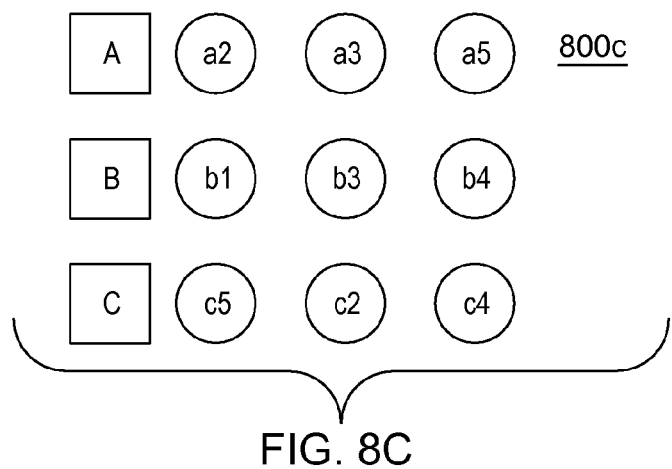
FIG. 8C is a feature matrix diagram.

Stage I relates to reduction of inter-class similarities and is more easily described using FIGS. 8A, 8B, and 8C as an example. Throughout this section references are made to these Figures. In this example, FIG. 8A depicts original feature matrix 800a, a 3×5 feature matrix (with a header column). The first row of original feature matrix 800a depicts feature vector A containing five features (elements) (that is, $a_1$, $a_2$, $a_3$, $a_4$, and $a_5$). Similarly, the second and third rows of original feature matrix 800a depict feature vectors B and C, respectively. Each of feature vectors A, B, and C are obtained from a separate class. For each element in original feature matrix 800a, a distance (score value) is calculated. In some embodiments of the present invention, the distance is the Euclidean distance. The distance between feature $a_1$ and the features of the other classes is computed as follows $$d(a_1,b_1), d(a_1,b_2), \ldots, d(a_1,c_5) \quad (1)$$

$$\text{Sum}(a_1, B) = \Sigma_{n=1}^{5} d(a_1, b_n) \quad (2)$$

$$D(a_1) = \frac{\text{Sum}(a_1, B) + \text{Sum}(a_1, C)}{2} \quad (3)$$

Expression (1) represents the calculation of the distance, d, between $a_1$ and the various features (also sometimes called elements or points) of feature vector B. In this example, there are three feature vectors, so the distance must also be calculated between $a_1$ and the various features of feature vector C. In this example, the distance between $a_1$ and the various features of the various feature vectors is calculated using the Euclidean distance. In some embodiments of the present invention, calculation of Expression (1) has a similarity with computation of a Hausdorff distance.

Expression (2) represents the calculation of the sum of the distances, Sum, between $a_1$ and the various features of feature vector B. In this example, feature vector B contains five features, therefore the sum in Expression (2) is calculated from feature 1 through feature 5 of feature vector B. In some embodiments of the present invention, Expression (2) is used to indicate a distance between one point of a first feature vector and a set of points from a different feature vector (also sometimes called a class) as a single value (also sometimes called a score). In some embodiments of the present invention, Expression (2) is not a necessary operation in the processing of Stage I.

Expression (3) represents the calculation of the overall distance, D, of $a_1$. In this example, the overall distance is calculated by averaging the sum of the distances between $a_1$ and the various features of feature vectors B and the sum of the distances between $a_1$ and the various features of feature vectors C. In this example, there are two other feature vectors, therefore the denominator in Expression (3) is 2. If, however, there is a different number of other feature vectors, the denominator in Expression (3) would change to accurately represent that number. In some embodiments of the present invention, Expression (3) gives an average "distance" for each feature, and allows the comparison of feature "distances" across classes. In some embodiments of the present invention, Expression (3) calculates a "sum" instead of an "average."

In some embodiments of the present invention, Expression (3) is not a necessary operation in the processing of Stage I. In some embodiments of the present invention, the calculations of Expression (2) and Expression (3) are combined into a single operation. In some embodiments of the present invention, Expression (1) and Expression (2) are combined into a single operation.

Expressions (1) through (3) are repeated for the various features in original feature matrix 800a. This results in the various features in original feature matrix 800a corresponding to a score value. As described, the score value (distance) measures the distance between a feature and the features belonging to other classes and expresses that distance as a single value.

FIG. 8B depicts distance matrix 800b. Distance matrix 800b represents a replacement of the features with the associated score values. Distance matrix 800b and original feature matrix 800a have the same dimensions (in this example, 3×5). The order of score values in distance matrix 800b is based on the order of features in original feature matrix 800a.

Subsequent to creating distance matrix 800b, the score values for features within a feature vector are sorted from largest to smallest. In some embodiments of the present invention, the largest score value represents the feature that is most distant (on average) from the various features of the other various feature vectors. After the score values are sorted, a subset of the features from each of the various feature vectors are retained and the remaining features are discarded. In some embodiments of the present invention, the same number of features are kept for each feature vector. In some embodiments of the present invention, the number of features kept is determined by using a threshold score value. In some embodiments of the present invention, the number of features kept is determined as a percentage of the number of features in the feature vector. In this example, the three features having the highest score value in each feature vector are retained.

FIG. 8C depicts filtered feature matrix 800c. Filtered feature matrix 800c contains the retained features (not the associated score values). In this example, filtered feature matrix 800c contains only the three features with the highest score values from each feature vector; therefore filtered feature matrix 800c is a 3×3 matrix. The remaining features have been filtered out. The features in filtered features matrix 800c are rearranged according to the associated score values. In some embodiments of the present invention, the feature in each feature vector with the largest score value appears in the first column. In some embodiments of the present invention, the size of the new matrix is reduced as compared with original feature matrix 800a. The preserved vectors contain the features with larger inter-class distance amongst the classes. It can be observed that usually after the sorting process, the order of the preserved features is different from the order in the original feature vectors.

A further example containing a further abstraction of the Expressions and Figures follows. In this example, the number of subjects (classes) is N and the number of features in each class is K. In some embodiments of the present invention, various classes have various numbers of features. In some embodiments of the present invention, K represents the number of features in the class containing the greatest number of features. The classes and respective elements are arranged into an N×K matrix, corresponding to original feature matrix 800a. Any of the classes in the feature matrix can be represented by $v_n$ (n=1, 2, . . . , N), corresponding to one of A, B, or C. Feature vector $v_n$ contains up to K features. The features in each feature vector can be represented by $v_n(f_k)$ (k=1, 2, . . . , K). Compute the distances between each feature, $f_k$, and the various features in the other classes. For example, $d[v_1(f_1), v_2(f_1)]$ indicates the distance between the first feature element in the feature vector for Class 1 and the first feature element in the feature vector for Class 2.

Computation of the score values is analogous to computation in Expressions (1), (2), and (3), above. Expressions (1'), (2'), and (3') represent the further abstracted, or further disambiguated, manner in which Stage I of the feature selection algorithm is implemented.

$$d[v_1(f_1), v_2(f_1)], \ldots, d[v_1(f_1), v_N(f_K)] \quad (1')$$

Expression (1') is analogous to Expression (1), above. Expression (1') represents the calculation of the set of distances between $v_1(f_1)$ and the various features included in the other feature vectors.

$$\text{Sum}[v_1(f_1), v_2] = \Sigma_{n=1}^{K} d[v_1(f_1), v_2(f_n)] \quad (2')$$

Expression (2') is analogous to Expression (2), above. Expression (2') represents the calculation of the distance between feature $v_1(f_1)$ and the various features in feature vector $v_2$.

$$D[v_1(f_1)] = \frac{\sum_{n=2}^{N} \text{Sum}[v_1(f_1), v_n]}{n-1} \quad (3')$$

Expression (3') represents the calculation of the score value of $v_1(f_1)$, which measures the average distance for any feature, in this case feature $v_1(f_1)$, in the original feature matrix (analogous to original feature matrix 800a) against the features in the other feature vectors (classes).

In some embodiments of the present invention, Expression (2') is not a necessary operation in the processing of Stage I. In some embodiments of the present invention, Expression (3') is not a necessary operation in the processing of Stage I. In some embodiments of the present invention, Expression (3') calculates a sum (a sum of the sums obtained in Expression (2')) instead of an average. In some embodiments of the present invention, the calculations of Expression (2') and Expression (3') are combined into a single operation. In some embodiments of the present invention, Expression (1') and Expression (2') are combined into a single operation.

The score values (distances) for the features in the original feature matrix are calculated using Expressions (1'), (2'), and (3'). A distance matrix is generated (analogous to distance matrix 800b). The distance matrix contains the same number of feature vectors and features within each feature vector as does the original feature matrix. However, the distance matrix contains the corresponding score values, in place of the features.

The feature vectors within the distance matrix are sorted according to the score values. This creates a sorted distance matrix, an operation between distance matrix 800b and filtered features matrix 800c (no analog is presented above). The sorted distance matrix and the original feature matrix have the same dimensions (in this example, N×K).

$$SDM = \text{sort}(DM) = \begin{bmatrix} \text{sort}(D(v_1)) \\ \vdots \\ \text{sort}(D(v_N)) \end{bmatrix} \quad (4')$$

Expression (4') represents the derivation of the sorted distance matrix (SDM). In Expression (4'), DM represents the distance matrix, $D(v_N)$ represents the set of score values of feature vector $v_N$ (that is, $D[v_N(f_1)]$ through $D[v_N(f_K)]$), and the sort function orders the features of feature vector $v_N$ based on the corresponding score values ($D[V_N(f_1)]$ through $D[v_N(f_K)]$). In some embodiments of the present invention, the sort function sorts the features of a feature vector with the largest score value occupying the first column of the sorted distance matrix.

$$PDM = \text{cull}(SDM) \quad (5')$$

Expression (5') represents the derivation of the preserved distance matrix (PDM). In Expression (5') the cull function culls a subset of the features in the feature vectors of the sorted distance matrix. The preserved distance matrix retains the subset of features having a higher score value, while the subset of features having a lower score value are culled. In some embodiments of the present invention, only those features having relatively high distance scores are preserved. In some embodiments of the present invention, the subset of features removed are determined as a percentage of the number of features. In some embodiments of the present invention, a best percentage of the features to keep is empirically established.

In this example, the locations of the score values within the preserved distance matrix correspond to the features to be preserved. This is achieved by keeping a percentage of the features from the sorted distance matrix. In this example, the features corresponding to the individual score values have not been modified, are retained, and can be located and recalled.

$$PFM = \text{reverse index}(PDM) \quad (6')$$

Expression (6') represents the derivation of the preserved feature matrix (PFM). In Expression (6'), for the score values in the preserved distance matrix, the reverse index function identifies the feature associated with a score value and maps or replaces the score values with the features. In this example, preservation of the indexing between the score value (distance) and the feature is necessary. In some embodiments of the present invention, the manipulation of the matrices in Expressions (4'), (5'), and (6') is achieved without replacing the features with score values. In some embodiments of the present invention, Expressions (4'), (5'), and (6') are achieved in one or two operations. In some embodiments of the present invention, a set of feature matrix correlates to the set of distance matrices (for example, the sorted distance matrix and the preserved distance matric) and operations on the distance matrices are mirrored on the set of feature matrices.

In some embodiments of the present invention, it is recognized that because biometric signals (more often behavioral biometric signals) are not stationary (that is, biometric signals vary dependent upon outside factors), mathematical modeling or mathematical prediction of the distribution of features in a biometric signal is not always possible. In some embodiments of the present invention, Expressions (1) and (1') are used to counteract this variance, through extensive computation of distances. In some embodiments of the present invention, Expressions (2) and (2') produce an indication of the global distance between one feature (element) and a whole feature vector (vector of elements) from another class. In some embodiments of the present invention, Expressions (3) and (3') are used to produce a measure of the average global distance between a single feature and all other classes. In some embodiments of the present invention, these distance-based metrics are employed to evaluate the features to preserve only the most discriminative candidates within a feature vector for classification and to filter out other features that would result in a poorer performance.

Stage II relates to shrinking intra-class feature spaces. In some embodiments of the present invention, Stage II is implemented without implementation of Stage I. In some embodiments of the present invention, Stage II is implemented prior to implementation of Stage I. Stage II is more easily described using FIGS. 6 and 9 as an example. Throughout this section references are made to these figures. In some embodiments of the present invention Stage II involves further shrinking of the intra-class feature space. Some embodiments of the present invention leverage shrinking of the intra-class feature space for a new target signature to better separate a set of features.

Figure 9:
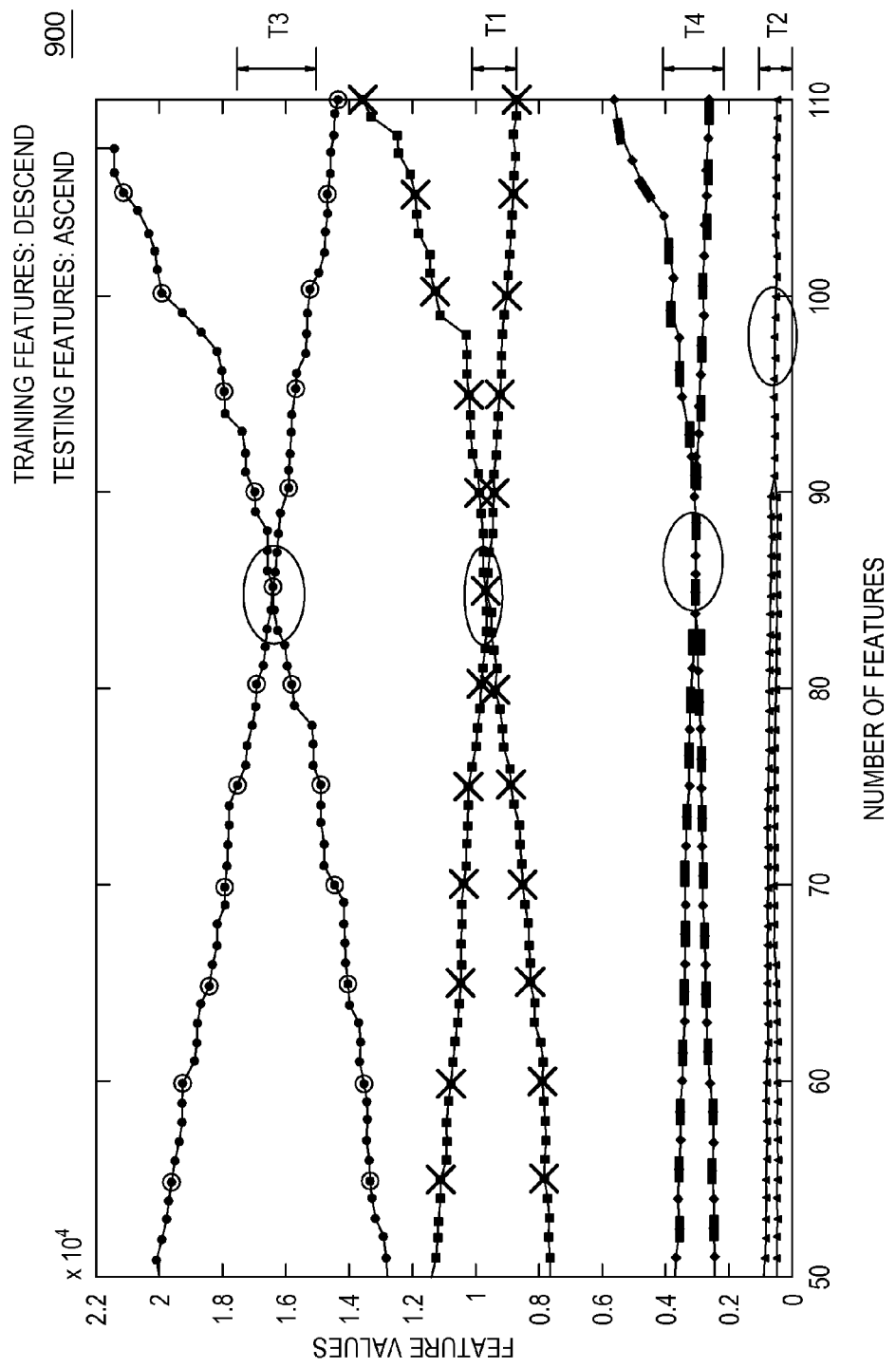
FIG. 9 is a graph helpful in understanding some embodiments of the present invention.

In this example, FIG. 9 depicts graphical feature representation 900. Graphical feature representation 900 is a two-dimensional line graph on which sets of feature vectors for four classes are plotted. The x-axis represents the number of features (also sometimes called observations) in each feature vector. The y-axis represents the raw value for each feature (in ten thousand unit increments). In this example, each feature vector is sorted (monotonically) by raw value for the constituent features. There are eight feature vectors represented in graphical feature representation 900, four training vectors (each belonging to a separate, known class) and four testing vectors (each belonging to one of the four classes, but for which the class is unknown). The training vectors are sorted in descending order and the testing vectors are sorted in ascending order. In this example, the training vector for each class represents a biometric signal from a known source; the four testing vectors represents a set of biometric signal from each of the known sources. The circled regions are the features of interests. The feature values covered by these circled regions are annotated on the right side of graphical feature representation 900. These circled regions represent the features that are most indicative of a class (that is: class T1 correlates to the range centered around raw value $1\times10^4$; class T2 correlates to $0.1\times10^4$; class T3 correlates to $1.7\times10^4$; and class T4 correlates to $0.3\times10^4$). The purpose of Stage II is to increase the likelihood of identifying to which known class (training vector) each of the four testing vectors belongs. In some embodiments of the present invention, the set of training vectors have been processed through Stage I, and the resultant feature vectors from the preserved feature matrix (Expression (6')) are used as the set of training vectors. In some embodiments of the present invention, the set of testing vectors have been processed through Stage I, and the resultant feature vectors from the preserved feature matrix (Expression (6')) are used as the set of testing vectors.

$$v_{Tr1}=\text{sort}(v_1); v_{Tr2}=\text{sort}(v_2); v_{Tr3}=\text{sort}(v_3); v_{Tr4}=\text{sort}(v_4) \quad (7)$$

$$v_{Te1}=\text{sort}^{-1}(v_5); v_{Te2}=\text{sort}^{-1}(v_6); v_{Te3}=\text{sort}^{-1}(v_7); v_{Te4}=\text{sort}^{-1}(v_8) \quad (8)$$

Expression (7) represents the monotonic sorting applied to feature vectors 1 through 4 (the vectors belonging to known classes), resulting in the training vectors, $v_{Tr1}$ through $v_{Tr4}$. In this example, the sort function sorts the features of the feature vectors in a strictly descending order. Expression (8) represents the monotonic sorting applied to feature vectors 5 through 8 (the vectors of unknown origin), resulting in the testing vectors, $v_{Te1}$ through $v_{Te4}$. In this example, the inverse sort function, represented as $\text{sort}^{-1}$, sorts the features of the feature vectors in a strictly ascending order. In this example, it is not required that $v_{Te1}$ has any relationship to $v_{Tr1}$, the ordinals are used only for organizational purposes. In some embodiments of the present invention, the training vectors are sorted in ascending order and the testing vectors are sorted in descending order. In some embodiments of the present invention, the set of feature vectors do not all have the same number of constituent features. In some embodiments of the present invention, features are removed from the set of longer feature vectors until all feature vectors are the same length. In some embodiments of the present invention, the following operations are repeated for any shorter feature vector by shifting or sliding the shorter feature vector. For example, looking at FIG. 9, if the feature vector starting nearest the top-right corner of graphical feature representation 900 (the training vector having enlarged dots) has five fewer features than the first testing vector (the testing vector having enlarged dots), the sliding scheme is repeated five times with the training vector moved one unit to the right for each repeated attempt. In some embodiments of the present invention, there is only one testing vector. In some embodiments of the present invention, there are more training vectors than testing vectors.

$$d_{Tr1Te1}=[n=1:k|\text{abs}(v_{Tr1}(f_n)-v_{Te1}(f_n))] \quad (9)$$

$$D_{Tr1Te1}=\min(d_{Tr1Te1}) \quad (10)$$

Expression (9) represents the calculation of the absolute distance vector, $d_{Tr1Te1}$, between training vector $v_{Tr1}$ and testing vector $v_{Te1}$. In Expression (9), k represents the number of features in the shorter feature vector. In this example, the abs function computes the absolute value of the difference of the raw signal data of one feature of the training vector from the raw signal data of one feature of the testing vector. The absolute distance vector comprises a set of signal element distances. In some embodiments of the present invention, the features in the shorter feature vector are shifted against the features in the longer feature vector. For example, if the testing vector is longer than the training vector, the shifted calculation would read $\text{abs}(v_{Tr1}(f_n)-v_{Te1}(f_{n+1}))$. In some embodiments of the present invention, the shifted absolute distance vector is denoted as $d_{Tr1Te1}$. This shift would be repeated until a comprehensive examination is achieved, by including each element of the longer feature vector in at least one calculation. In some embodiments of the present invention, Expression (9) is repeated for each combination of one training vector and one testing vector. In this example, there are 16 combinations of one training vector and one testing vector.

Expression (10) represents the calculation of the minimum absolute distance vector, $D_{Tr1Te1}$. In Expression (10), the min function locates and retains the index values (the identity of the feature value, not the observed value of that feature value) for the subset of the signal element distances having the smallest values. In FIG. 9, the application of Expression (10) to the set of feature vectors results in the four sets of circled features. In this example, the min function retains the index values for five elements. In some embodiments of the present invention, the min function retains only a single index value. In some embodiments of the present invention, the min function retains a percentage of the index values. In some embodiments of the present invention, the monotonic sorting of the training vector and the inverse monotonic sorting of the testing vector creates a best fit, located around the intersection point of the training vector and the testing vector. In some embodiments of the present invention, the minimum absolute distance vector compares the absolute distance vector with the set of shifted absolute distance vectors and selects the set of index values based on the shortest set of signal element distances from a single absolute distance vector or shifted absolute distance vector. For example, if the five shortest distances in $d_{Tr1Te1}$ are (3,2,0,3,4) and the five shortest distances in $d_{Tr'1Te1}$ are (2,1,1,1,2), the minimum absolute distance vector, $D_{Tr1Te1}$, would contain the index values for the signal element distances in $d_{Tr'1Te1}$.

In some embodiments of the present invention, the determination of the representative feature values is made in a different manner:

$$d_{sorted} = \text{sort}(d_{Tr1Te1}) \quad (11)$$

$$d_{selected} = d_{sorted}(1:k_{selected}) \quad (12)$$

Expression (11) represents a sorting of the feature values of the absolute distance vector, $d_{Tr1Te1}$, into a sorted vector, $d_{sorted}$. In this example, the sort function orders the absolute distance values of the absolute distance vector from greatest to least based on the feature value. Expression (12) selects the representative feature values of the sorted vector. In this example, the number of feature values retained is $k_{selected}$. It is axiomatic that $k_{selected}$ is equal to or smaller than the number of feature values in the absolute distance vector. In some embodiments of the present invention, $d_{selected}$ is equivalent to $D_{Tr1Te1}$.

In FIG. 9, the circled regions contain the set of selected features for each of the testing vectors and the intersections with the respective proposed training vectors (classes) to which the testing vectors belong. In this example, application of Stage II to the set of training and testing vectors has further shrank the intra-class feature space for the set of new target signatures, better separating the features to be analyzed. In this example, the circled regions represent the features of interest.

FIG. 6 represents an illustration of the operational algorithm, including both Stage I and Stage II. FIG. 6 depicts two-dimensional feature space 600 illustrating an implementation of the operational algorithm. The feature space for Class 1 is represented by feature element 604 and the feature space for Class 2 is represented by feature element 606. After application of Stage I of the operational algorithm, the feature space for Class 1 is reduced to feature element 608 and the feature space for Class 2 is reduced to feature element 610. After application of Stage II of the operational algorithm the optimal subspace for each class is further reduced, for Class 1 the optimal space is reduced to feature spaces 616A and 618A and for Class 2 the optimal space is reduced to feature spaces 616B and 618B. In this example, there are two optimal spaces for each class. In some embodiments of the present invention, a testing vector crosses multiple training vectors (looking at FIG. 9, the two uppermost testing vectors intersect with their respective training vectors, but if the x-axis of the graph were expanded, the testing vectors may intersect the non-representative training vector). In this example, feature space 616A represents the illustrative version of the minimum absolute distance vector for testing vector (target signature) 1 and training vector (feature space for class) 1; feature space 616B represents the illustrative version of the minimum absolute distance vector for testing vector (target signature) 1 and training vector (feature space for class) 2; feature space 618A represents the illustrative version of the minimum absolute distance vector for testing vector (target signature) 2 and training vector (feature space for class) 1; feature space 618B represents the illustrative version of the minimum absolute distance vector for testing vector (target signature) 2 and training vector (feature space for class) 2. Based on the illustrative example in FIG. 6, it is determined that testing vector (target signature) 2 belongs to class (training vector) 1 and testing vector (target signature) 1 belongs to class (training vector) 2.

Some embodiments of the present invention include pattern recognition in noisy and sparse data classes in a sensor system. Some embodiments of the present invention include determining a feature vector within a data class, wherein the feature vector has a plurality of feature elements and each feature element in the plurality of feature elements has a value determined by a different aspect of the data in the corresponding class. Some embodiments of the present invention include calculating a distance score for each feature element in a plurality of feature elements based on all other feature elements. Some embodiments of the present invention include determining a filtered feature vector for each data class comprising only a subset of the corresponding feature elements having a higher distance score. Some embodiments of the present invention include generating a set of training features and a set of testing features for each data class of the sensor system based on a filtered feature vector.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
receiving, by machine logic of a computer, a set of vector data, wherein the set of vector data includes a plurality of vector values from each class of a plurality of classes;
applying, by machine logic of the computer, an inter-class filtering to the set of vector data, wherein the inter-class filtering is based, at least in part, on an inter-class distance; and
applying, by machine logic of the computer, an intra-class filtering to the set of vector data, wherein the intra-class filtering is based, at least in part, on an intra-class distance;
wherein:
the inter-class distance is based on a sum of distances between: (i) a subject vector value in the plurality of vector values; and (ii) at least some of the vector values in the plurality of vector values of at least one other class of the plurality of classes; and
the intra-class distance is based on a sum of distances between: (i) a subject vector value in the plurality of vector values in a first class of the plurality of classes; and (ii) at least some of the vector values in the plurality of vector values of the first class.

2. The method of claim 1, further comprising:
performing, by machine logic of the computer, a pattern recognition related action, wherein the pattern recognition related action is based, at least in part, on the inter-class filtering and the intra-class filtering.

3. The method of claim 2, wherein the performing, by machine logic of the computer, a pattern recognition related action includes:
assigning, by machine logic of the computer, a pattern to each class in the plurality of classes, wherein the pattern is based on: the inter-class filtering or the intra-class filtering.

4. The method of claim 2, wherein the performing, by machine logic of the computer, a pattern recognition related action includes:
determining, by machine logic of the computer, a class to which an unknown vector value in the plurality of vector values belongs based, at least in part, on a previous pattern recognition related action.

5. The method of claim 1, wherein:
the inter-class distance is based on a sum of Euclidean distances between: (i) a subject vector value in the plurality of vector values; and (ii) at least some of the vector values in the plurality of vector values of at least one other class of the plurality of classes; and
the intra-class distance is based on a sum of Euclidean distances between: (i) a subject vector value in the plurality of vector values in the first class of the plurality of classes; and (ii) at least some of the vector values in the plurality of vector values of the first class.

6. The method of claim 1, further comprising:
applying, by machine logic of the computer, a density estimation to each class of the plurality of classes, wherein the density estimation is based, at least in part, on a determination of a representation for each class of the plurality of classes.

7. The method of claim 1 further comprising:
applying, by machine logic of the computer, a second inter-class filtering to the set of vector data, wherein the second inter-class filtering is based, at least in part, on a second inter-class distance.

8. A computer program product comprising a computer readable storage medium having stored thereon:
first program instructions programmed to receive a set of vector data, wherein the set of vector data includes a plurality of vector values from each class of a plurality of classes;
second program instructions programmed to apply an inter-class filtering to the set of vector data, wherein the inter-class filtering is based, at least in part, on an inter-class distance; and
third program instructions programmed to apply an intra-class filtering to the set of vector data, wherein the intra-class filtering is based, at least in part, on an intra-class distance;
wherein:
the inter-class distance is based on a sum of distances between: (i) a subject vector value in the plurality of vector values; and (ii) at least some of the vector values in the plurality of vector values of at least one other class of the plurality of classes; and
the intra-class distance is based on a sum of distances between: (i) a subject vector value in the plurality of vector values in a first class of the plurality of classes; and (ii) at least some of the vector values in the plurality of vector values of the first class.

9. The computer program product of claim 8, further comprising:
fourth program instructions programmed to perform a pattern recognition related action, wherein the pattern recognition related action is based, at least in part, on the inter-class filtering and the intra-class filtering.

10. The computer program product of claim 9, wherein the fourth program instruction programmed to perform a pattern recognition related action includes:
fifth program instruction programmed to assign a pattern to each class in the plurality of classes, wherein the pattern is based on: the inter-class filtering or the intra-class filtering.

11. The computer program product of claim 9, wherein the fourth program instruction programmed to perform a pattern recognition related action includes:
fifth program instruction programmed to determine a class to which an unknown vector value in the plurality of vector values belongs based, at least in part, on a previous pattern recognition related action.

12. The computer program product of claim 8, wherein:
the inter-class distance is based on a sum of Euclidean distances between: (i) a subject vector value in the plurality of vector values; and (ii) at least some of the vector values in the plurality of vector values of at least one other class of the plurality of classes; and
the intra-class distance is based on a sum of Euclidean distances between: (i) a subject vector value in the plurality of vector values in the first class of the plurality of classes; and (ii) at least some of the vector values in the plurality of vector values of the first class.

13. The computer program product of claim 8, further comprising:
fourth program instructions programmed to apply a density estimation to each class of the plurality of classes, wherein the density estimation is based, at least in part, on a determination of a representation for each class of the plurality of classes.

14. A computer system comprising:
a processor set; and
a computer readable storage medium;
wherein:
the processor set is structured, located, connected, and/or programmed to run program instructions stored on the computer readable storage medium; and
the program instructions include:
first program instructions programmed to receive a set of vector data, wherein the set of vector data includes a plurality of vector values from each class of a plurality of classes;
second program instructions programmed to apply an inter-class filtering to the set of vector data, wherein the inter-class filtering is based, at least in part, on an inter-class distance; and
third program instructions programmed to apply an intra-class filtering to the set of vector data, wherein the intra-class filtering is based, at least in part, on an intra-class distance;
wherein:
the inter-class distance is based on a sum of distances between: (i) a subject vector value in the plurality of vector values; and (ii) at least some of the vector values in the plurality of vector values of at least one other class of the plurality of classes; and
the intra-class distance is based on a sum of distances between: (i) a subject vector value in the plurality of vector values in a first class of the plurality of classes; and (ii) at least some of the vector values in the plurality of vector values of the first class.

15. The computer system of claim 14, further comprising:
fourth program instructions programmed to perform a pattern recognition related action, wherein the pattern recognition related action is based, at least in part, on the inter-class filtering and the intra-class filtering.

16. The computer system of claim 15, wherein the fourth program instruction programmed to perform a pattern recognition related action includes:
fifth program instruction programmed to assign a pattern to each class in the plurality of classes, wherein the pattern is based on: the inter-class filtering or the intra-class filtering.

17. The computer system of claim 15, wherein the fourth program instruction programmed to perform a pattern recognition related action includes:
fifth program instruction programmed to determine a class to which an unknown vector value in the plurality of vector values belongs based, at least in part, on a previous pattern recognition related action.

18. The computer system of claim 14, wherein:
the inter-class distance is based on a sum of Euclidean distances between: (i) a subject vector value in the plurality of vector values; and (ii) at least some of the vector values in the plurality of vector values of at least one other class of the plurality of classes; and
the intra-class distance is based on a sum of Euclidean distances between: (i) a subject vector value in the plurality of vector values in the first class of the plurality of classes; and (ii) at least some of the vector values in the plurality of vector values of the first class.

19. The computer system of claim 14, further comprising:
fourth program instructions programmed to apply a density estimation to each class of the plurality of classes, wherein the density estimation is based, at least in part, on a determination of a representation for each class of the plurality of classes.

20. The computer system of claim 14 further comprising:
fourth program instructions programmed to apply a second inter-class filtering to the set of vector data, wherein the second inter-class filtering is based, at least in part, on a second inter-class distance.

* * * * *